June 17, 1969  B. R. GENTRY ET AL  3,450,041

CHECK WRITING AND ENCODING APPARATUS AND METHOD

Filed May 1, 1967  Sheet 1 of 8

BRYAN ROBERT GENTRY
JOHN R. NICHOLS
INVENTORS.

BY

Townsend & Townsend

BRYAN ROBERT GENTRY
JOHN R. NICHOLS
INVENTORS.

BY

Townsend & Townsend

BRYAN ROBERT GENTRY
JOHN R. NICHOLS
INVENTORS.

BRYAN ROBERT GENTRY
JOHN R. NICHOLS
INVENTORS.

BY
Townsend and Townsend

BRYAN ROBERT GENTRY
JOHN R. NICHOLS
INVENTORS.

BY
Townsend & Townsend

June 17, 1969     B. R. GENTRY ET AL     3,450,041

CHECK WRITING AND ENCODING APPARATUS AND METHOD

Filed May 1, 1967

BRYAN ROBERT GENTRY
JOHN R. NICHOLS
      INVENTORS.

BY

*Townsend and Townsend*

United States Patent Office 3,450,041
Patented June 17, 1969

3,450,041
CHECK WRITING AND ENCODING
APPARATUS AND METHOD
Bryan R. Gentry, 800 Parrott Drive, San Mateo, Calif.
94402, and John R. Nichols, 1777 Valley View Ave.,
Belmont, Calif. 94002
Filed May 1, 1967, Ser. No. 635,160
Int. Cl. B41j 21/00; B41l 15/00
U.S. Cl. 101—90                                   22 Claims

ABSTRACT OF THE DISCLOSURE

Apparatus and a method for simultaneously writing the amount of a check and the corresponding computer encoding indicia on the MICR line of the check. Each MICR printing wheel of the apparatus is linked to a corresponding amount printing wheel so that they move together when the amount is set up in the apparatus.

---

This invention relates to improvements in the mechanical writing of checks and, more particularly, to an apparatus and method for simultaneously writing the amount and corresponding computer indicia on a check.

The apparatus and method of this invention relates to the writing of an amount on the amount line of the check while at the same time magnetic indicia, known in the banking profession as magnetic ink character recognition and abbreviated MICR, are applied on the MICR line of the check. The purpose of the MICR indicia is to permit conventional computer techniques to be utilized in accounting procedures, whereby balances can be readily obtained and statements can be quickly prepared. The magnetic nature of the MICR indicia is required to facilitate the reading of the indicia by computer equipment. Moreover, the design of the computer equipment requires that these indicia be applied at a specific location on the check.

The present invention is directed to the application of the MICR indicia in accordance with the amount of the check and, in addition, provides for the application of an account number on the MICR line as a further aid in the accounting procedure.

In a preferred embodiment of the apparatus, a number of amount printing checks are provided for printing the digits of the amount on a check. These printing wheels are rotatably mounted on a common shaft and are manually moved so that the proper amount is set up in the apparatus before the actual printing takes place. As the printing wheels are moved into position corresponding MICR printing wheels are also rotated so that the MICR printing wheels are disposed to print the amount on the MICR line simultaneously with the printing of the amount on the amount line of the check. A linkage, such as a gear train, interconnects each amount printing wheel with the corresponding MICR printing wheel.

A number of additional MICR printing wheels are provided to apply an account number in the MICR line when the apparatus is actuated. These account printing wheels are manually manipulated in the same manner as the amount is set up in the apparatus. Thus, prior to actuating the apparatus, such as by pressing a switch or the like, the operator, either before or after inserting the check in the apparatus, need only to set the amount and the account number in the machine. Actuation of the machine prints the amount and the MICR line indicia and thereafter automatically ejects the check from the apparatus so that the latter will be in a condition to receive a succeeding check.

A number of safety features are provided in the apparatus to assure that each check handled thereby will be properly printed with the amount and the correct MICR indicia and also that the MICR line will be at the proper location on the check to permit computer processing thereof. To this end, the apparatus will not operate if the amount or account number settings are not properly made nor will it operate unless a check is inserted in the apparatus and is in the predetermined printing position provided therefor. These safety features prevent the printing of misaligned numbers on the amount and MICR lines and they prevent the build-up of printing ink or magnetic coating on backing plates which support each check during the printing operation. The build-up of magnetic coating on a backing plate would cause a transfer of the magnetic coating to the back face of a succeeding check to be written and the additional magnetic coating would cause the check to be misread or completely rejected by a computer during an accounting procedure. In effect, therefore, the aforesaid safety features prevent the operation of the apparatus until it and the operator are ready to print each check properly.

The method of the invention includes the step of simultaneously printing the amount and MICR line of a check. The method also is directed to the way in which the check moves relative to a print region so as to assure the printing of both of the above lines.

For a bank or other financial institution to utilize computer techniques in accounting procedures, it must mark each check which is to be processed with suitable indicia to which computer equipment is responsive. Generally, this indicia is in the form of magnetic ink and the check is urged past sensors in a computer which then is actuated in response to the sensing of the magnetic indicia.

The magnetic indicia is applied on the so-called MICR line of a check and it is placed on the check after the check has been written and returned to the bank for payment. The indicia applied to the check at this time is the amount of the check.

The disadvantage of processing checks in this manner is that the MICR line indicia corresponding to the amount of the check must be applied after the check has been written. This increases the time and effort required to utilize computers as accounting tools and is subject to errors inasmuch as the machine which applies the MICR indicia is manually operated.

The present invention overcomes this disadvantage by providing apparatus and a method for simultaneously applying the amount of the check and the corresponding MICR indicia. This greatly simplifies the task of handling the check during normal accounting procedures by clearly eliminating one time-consuming step in the procedure.

The invention provides an added advantage in that classified indicia can be applied to a check along with the amount indicia on the MICR line. Thus, a computer, if properly programmed, can provide additional information for a bank statement such as listing a number of checks according to the purpose for which they were drawn. This latter feature allows the drawer of a number of checks to see at a glance the expenditures that have been made in a particular category.

The primary object of the invention is, therefore, to provide apparatus and a method of writing a check wherein the amount of the check and the corresponding MICR indicia are simultaneously printed at the proper locations on the check to eliminate having to write the MICR indicia on the check immediately before computer process.

The aforesaid object is achieved by providing a bank of amount printing wheels or devices which are operably coupled by linkage means to respective MICR print wheels so that, as each amount wheel is shifted into the desired operative position, the corresponding MICR print wheel is also moved. Thus, after the amount has been set up for writing a check, actuation of the apparatus will cause the amount and MICR printing wheels to engage and thereby print a check at the same time. When the check is returned to a bank in the normal course of banking, it is immediately ready to be processed by a computer since no additional data must be applied to the check in order to direct it through the computer.

To apply the classification indicia, additional print wheels are provided adjacent to the MICR printing wheels which are coupled to the amount printing wheels. These classification wheels are manually shifted into place so that a number of different classifications can be set up in the apparatus.

The apparatus has a number of safety features which prevent inadvertent printing of the check until it is properly oriented relative to the printing wheels. This mainly assures that the MICR indicia will be applied at the proper location since the design of computers requires that the MICR line be applied to the check within relatively narrow limits.

Another object of the invention is therefore to provide apparatus and a method for assuring that a check is properly positioned before it is written to thereby eliminate errors in the positioning of the MICR indicia on the check as well as errors in the actual indicia themselves.

Other objects of the invention will become apparent as the following specification progresses.

Figure 1:
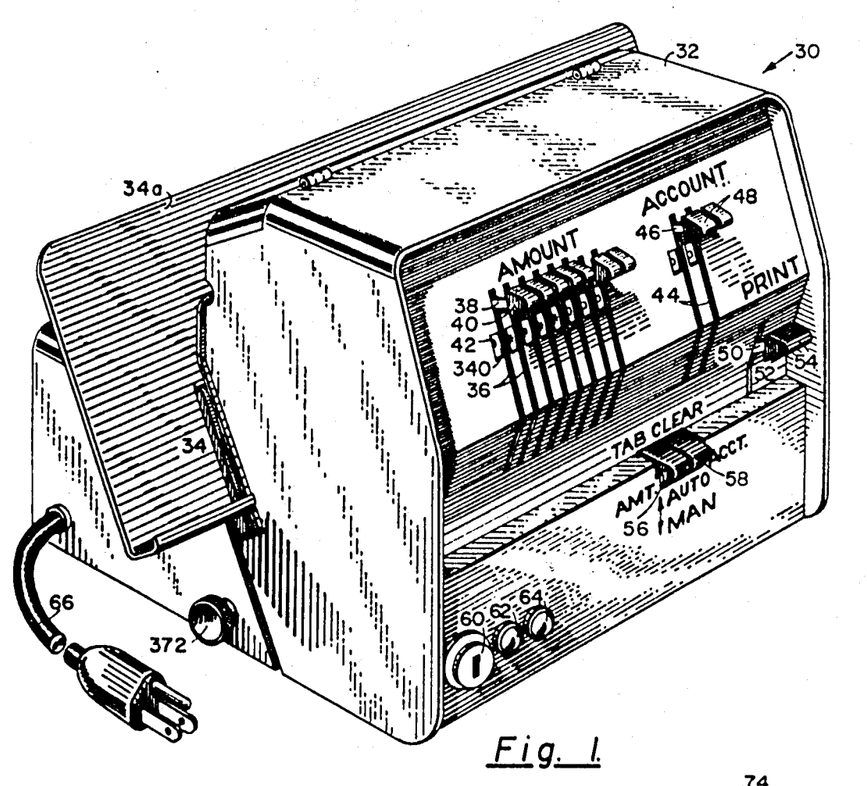
FIG. 1 is a perspective view of the check-writing apparatus.

Check-writing apparatus 30 is shown in FIGURE 1 and includes a housing 32 in which the various components of the apparatus are disposed. The housing has a guideplate 34 provided with an extension 34A which directs a check to be written into a printing disposition. The housing has slots 36 through which levers 38 project, the levers being connected to amount printing wheels or devices hereinafter described. Tabs 40 on the outer ends of respective levers 38 facilitate the manual movement thereof. Windows 42 allow the amount represented by each printing wheel to be observed, the amount being determined by the setting of the various levers 38 longitudinal of slots 36.

The housing also has slots 44 through which a pair of levers 46 extend. Tabs 48 are secured to the outer ends of respective levers 46. Levers 46 allow an account number to be set into the machine before a check is written so that the account number, along with the MICR amount number, will be printed on the check.

Another lever 50 projects through a slot 52 and has a tab 54 thereon. Lever 50 is forced downwardly when it is desired to actuate the apparatus and thereby print a check supported by guideplate 34.

Where it is desired to print the same amount and the same account number on a number of checks, tabs 56 and 58 are forced downwardly into a manual position. Otherwise, the tabs are in their up or automatic positions wherein levers 38 and 46 return to their uppermost or starting positions after each check is printed.

The housing is provided with a key operated switch 60 and has panel lights 62 and 64 which indicate certain operative conditions of the apparatus hereinafter described. Power is supplied by lead 66 to the apparatus to actuate a drive motor which moves the printing wheels and the check relative to each other and into engagement whereby the check is printed.

Figure 2:
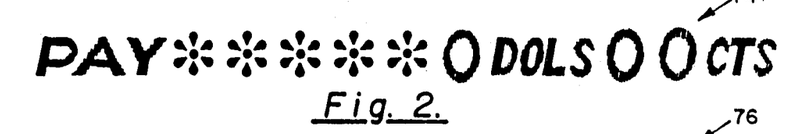
FIG. 2 is a view of one example of indicia which is written on the amount line of a check by the apparatus of FIG. 1.
Figures 6, 7, 8:
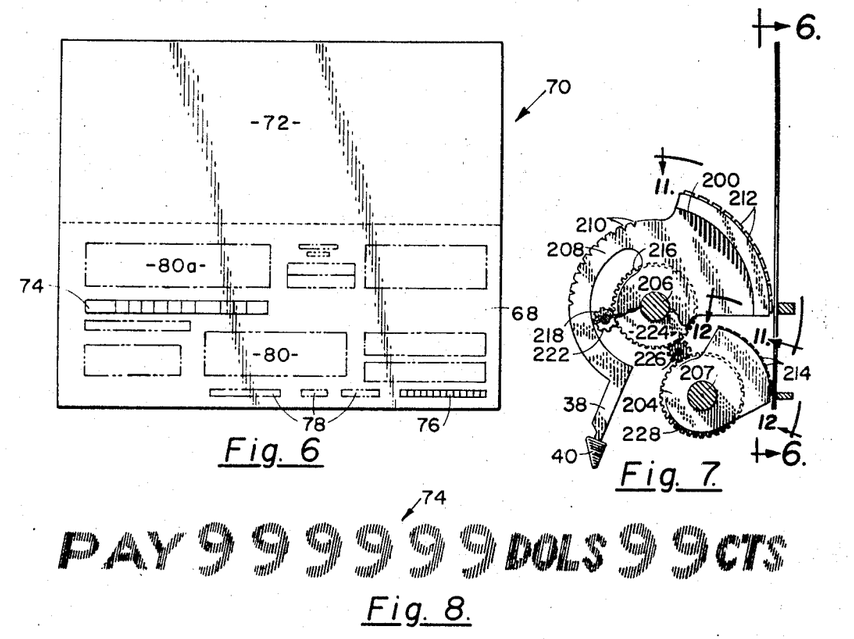
FIG. 6 is a front elevational view of a check of the type to be written by the apparatus, the view looking in the direction of line 6—6 of FIG. 7.
FIG. 7 is a wide elevational view of an amount printing wheel and an MICR printing wheel, showing the structure interconnecting the wheels for simultaneous rotation about respective axes.
FIG. 8 is a view similar to FIG. 2 and showing the largest amount that can be written by the apparatus.

FIG. 2 illustrates an example of the amount line to be applied to the check. The check, itself, is denoted by the numeral 68 and is shown in FIG. 6 as being the bottom portion of a sheet 70 whose top portion 72 provides space for voucher information. When the check is inserted in the machine, the top portion 72 will be visible to the operator of the apparatus and voucher information will have been applied to portion 72 before the check is written. Thus, the operator can set up the amount and the account number by relying upon the voucher information itself.

The amount line 74 is spaced above and to the left of the MICR line 76. Line 76 will simultaneously be applied to the check with line 74 and it is aligned with other MICR indicia 78 placed on the check when it is in a blank condition. The other areas on check 68 are for dates, names, addresses and other desired information. The arrangement of the information is not critical except that MICR line 76 must be aligned with the other MICR indicia 78 in order for the check to be processed by computer techniques. For purposes of illustration, the rectangle 80 is provided for the name and address of the payee and rectangle 80A is provided for the name and address of the payor. Thus, the check is suitable for insertion in a two-window, no-typing envelope.

Figure 3:
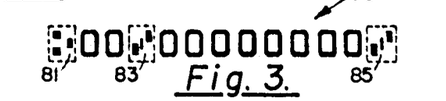
FIG. 3 is an example of the indicia written on the MICR line of a check as the amount indicia is placed on the check.
Figure 9:
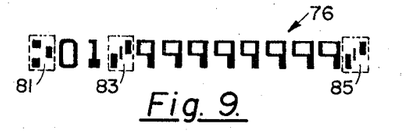
FIG. 9 is a view of the MICR line corresponding to the amount of FIG. 8 and further showing an account number preceding the amount indicia.

FIG. 3 illustrates the MICR line 76 which is to be applied to the check in the manner shown in FIG. 6. FIGS. 8 and 9 correspond to FIGS. 2 and 3 but show the largest amount that can be printed with the apparatus as described herein. The numerals are printed by the printing wheels and the notations "PAY," "DOLS" and "CTS" are printed by slugs mounted adjacent to the amount printing wheels.

Line 76 (FIGS. 3 and 9) has two numerals at the far left end of the line which represent the account or classification number to which the check is to be drawn. To the left of these two numerals is a computer signal 81 which notifies the computer of the following: The check has been preencoded and is to be rejected from the normal encoder routine (to encode the check is to print the MICR line immediately before directing it into the computer), the amount is to be debited to the customer's account only under the account number given in the succeeding two columns. Signal 80 is printed by a slug adjacent to the MICR printing wheels.

A computer signal 83 follows the account numbers and a computer signal 85 is at the end of the MICR line. These are the standard signals which notify the computer that the amount numerals follow and that the end of the data input has been reached respectively.

Figure 10:
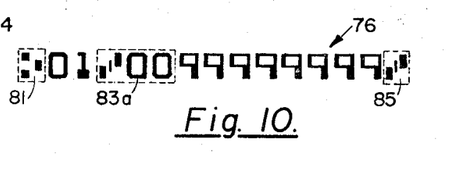
FIG. 10 is a view similar to FIG. 9 but showing two additional digits for use with 10-digit computer inputs.

In the event that the computer is programable only for ten-digit amount inputs, extra digits can be inserted in the form of a slug which replaces the slug corresponding to signal 83. Thus, a signal and numeral combination 83A (FIG. 10) can be provided to add the additional numerals.

Figure 13:
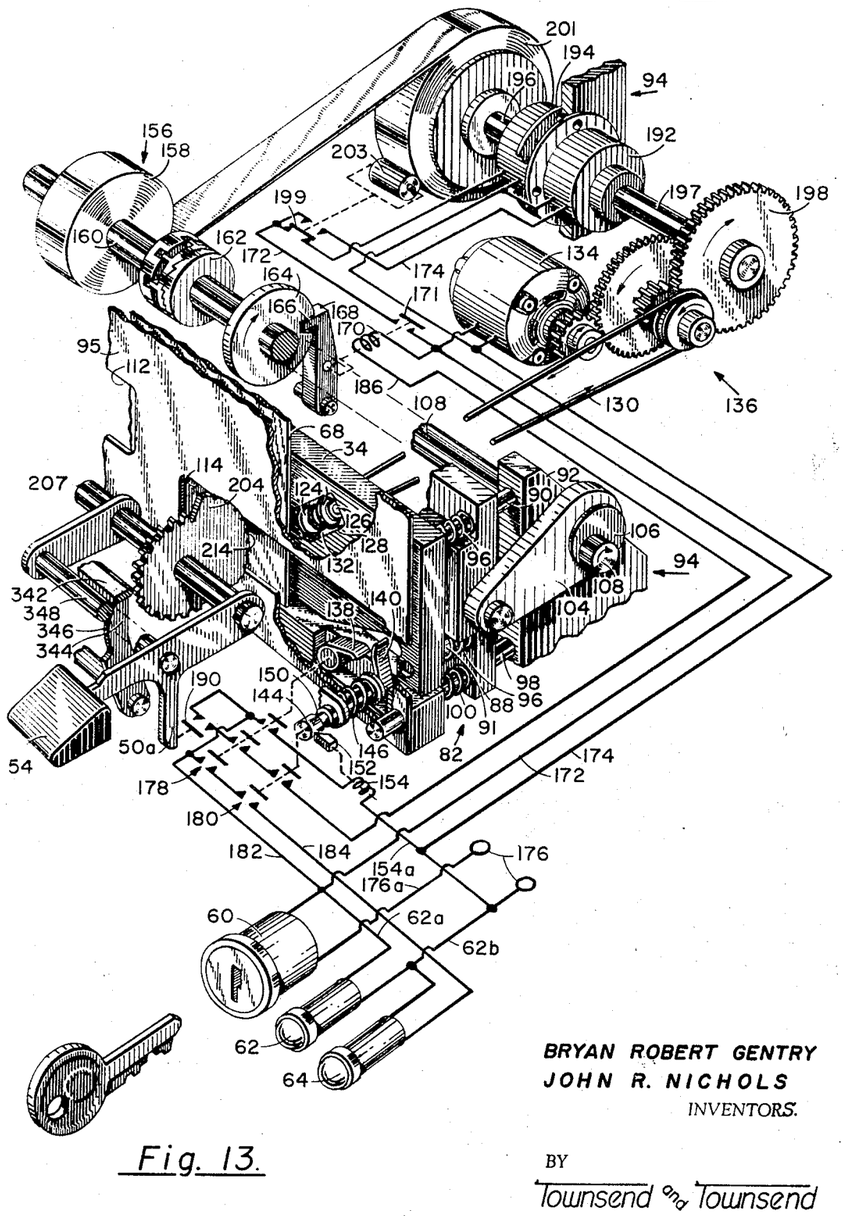
FIG. 13 is a perspective view of a portion of the apparatus, showing the power drive means thereof and the electrical circuitry therefor.

The basic elements of apparatus 30 are shown in FIG. 13 and include structure 82 for positioning and maintaining a check 68 in a printing unit 84 adjacent to one side of structure 82 and shiftable relative thereto, and drive means 86 coupled with structure 82 for moving the same relative to printing unit 84 so that check 64 is moved into and out of engagement with the printing wheels and slugs of printing unit 84. For purposes of illustration, FIG. 13 is partially schematic to include the electrical system which actuates the shiftable mechanical components. Also, the housing is now shown so that the components can be illustrated isometrically.

General operation

A check to be written will first be provided with voucher information on top portion 72. This information will include the amount of the check and the particular account number to which the check pertains. The operator of apparatus 30 then places the check in the machine by allowing plate 34 to guide the check into place. The operator then sets up the amount and the account number in the apparatus by manipulating levers 38 and 46. The operator need merely to observe the voucher information to determine how these levers are to be positioned.

As soon as the check is in place and the amount set up, the operator presses lever 50 downwardly to actuate drive means 86. This action causes the drive means to move structure 82 toward printing unit 84 and through a distance sufficient to cause the check to move into engagement with the printing unit. Actually, an inked ribbon is disposed between the amount printing wheels and the check and a magnetic tape is disposed between the MICR print wheels and the check. Thus, when the check approaches the printing unit it forces the ribbon and tape against respective wheels and thereby receives the corresponding impressions which, in effect, print the check.

The drive means then returns structure 82, carrying the check away from printing unit 84. Thereupon, the check is ejected laterally from the apparatus so that the latter is ready to write a succeeding check.

Check positioning and handling structure

Structure 82 includes a platen 88 mounted for reciprocation on upper and lower guide rods 90 and 91, which project forwardly from a pair of spaced blocks 92 forming a part of a support 94. Only one of the blocks is shown in FIG. 13 but it is to be noted that platen 88 has its ends adjacent to respective blocks. Rods 90 and 91 extend through and thereby shiftably mount guide plate 34 and a shield 95 for reciprocation relative to blocks 92. Opposite ends of rods 90 and 91 (not shown) are secured to support 94 at a suitable location thereon. Coil springs 96 surround these rods between plate 34 and platen 88. A number of rods 98, each having a coil spring 100 about the same, project outwardly from platen 88. Plate 34 is shiftably mounted on rods 98 and springs 100 are disposed between plate 34 and platen 88.

Platen 88 is reciprocated by a reciprocating arm 104 secured to each end of the platen respectively. Arms 104 are secured to discs 106 which are eccentrically mounted at spaced locations on a shaft 108. Discs 106 rotate within openings in respective arms 104 so that the arms are moved forwardly and rearwardly for each revolution of shaft 108.

As the arms move forwardly, shield 95, plate 34 and platen 88 move together toward printing unit 84 until the shield engages a stop 110 on support 94. This brings the shield to a halt with its back face substantially flush with the printing faces of the amount and MICR printing wheels of printing unit 84. Springs 96 then commence to compress as plate 34 and platen 88 continue to move under the influence of arms 104. This movement continues until the check is forced into tight engagement with the back face of shield 95. The check is, thus, firmly gripped between the shield and plate 34 except in the areas adjacent to an amount window 112 and a MICR window 114 formed in the shield.

Figure 21:
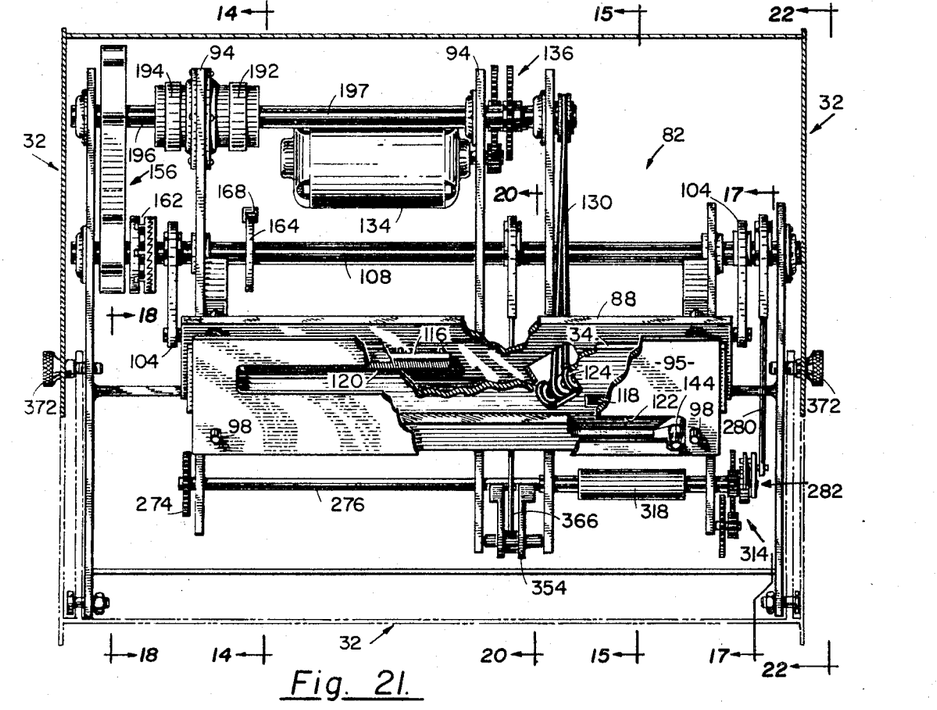
FIG. 21 is a horizontal section through the apparatus, taken along line 21—21 of FIGS. 14 and 15.

When the check is forced against the shield 95, plate 34 stops moving but platen 88 continues to move. This causes an amount printing bar 116 and a MICR printing bar 118 (FIG. 21) on the front face of the platen to move through plate 34 and against the rear face of the check. Plate 34 has openings 120 and 122 through which bars 116 and 118 extend.

Movement of arms 104 in the opposite direction cause platen 88 to retract and allow springs 96 to expand, thus, returning plate 34 and shield 95 to their starting positions.

Structure 82 further includes check moving means, including a pair of drive wheels 124 mounted on a shaft 126 for rotation about an inclined axis. Wheels 124 project partially through an opening 128 in plate 34 and are rotatable by means of an endless flexible belt 130 to advance the check downwardly and to the side. Belt 130 is coupled to a pulley 132 on shaft 126 and is driven by an electric motor 134 through a gear train 136.

When a check is placed in the apparatus and the motor is operating, wheels 124 engage the rear face of the check and move it downwardly and to the side until the check strikes a pair of trips 138 and 140. These trips stop the check and position it for printing by the print wheels of unit 84. Trips 138 and 140 are also shiftable with respect to plate 34 so that they close operating switches in a manner to be described. To this end, they are rotatably mounted on respective shafts 142 and 144 connected to support 94. The trips are spring biased so that they return to their starting positions each time a check leaves the apparatus.

Shaft 126 mounting wheels 124 on plate 34 are spring mounted in pillow blocks (not shown) secured to the front face of platen 88. Belt 130 has an inherent resilience so that it can stretch slightly as platen 88 is advanced toward the printing unit. However, the spring mounting of shaft 126 causes it to, in effect, retract relative to plate 34 so that the wheels 124 move further into opening 128 and thereby out of engagement with the check. Thus, the check is not under the influence of these drive wheels during the printing operation. However, when the platen returns to its starting position, the drive wheels once again project partially through opening 128 and engage the back face of the check. Trip 140, which normally prevents any lateral movement of the check, is retained in a locked position hereinafter dencribed as the platen returns to its starting position. Thus, sufficient clearance is provided to allow the check to be shifted laterally by wheels 124 and thereby out of the apparatus.

Figures 27, 28, 29:
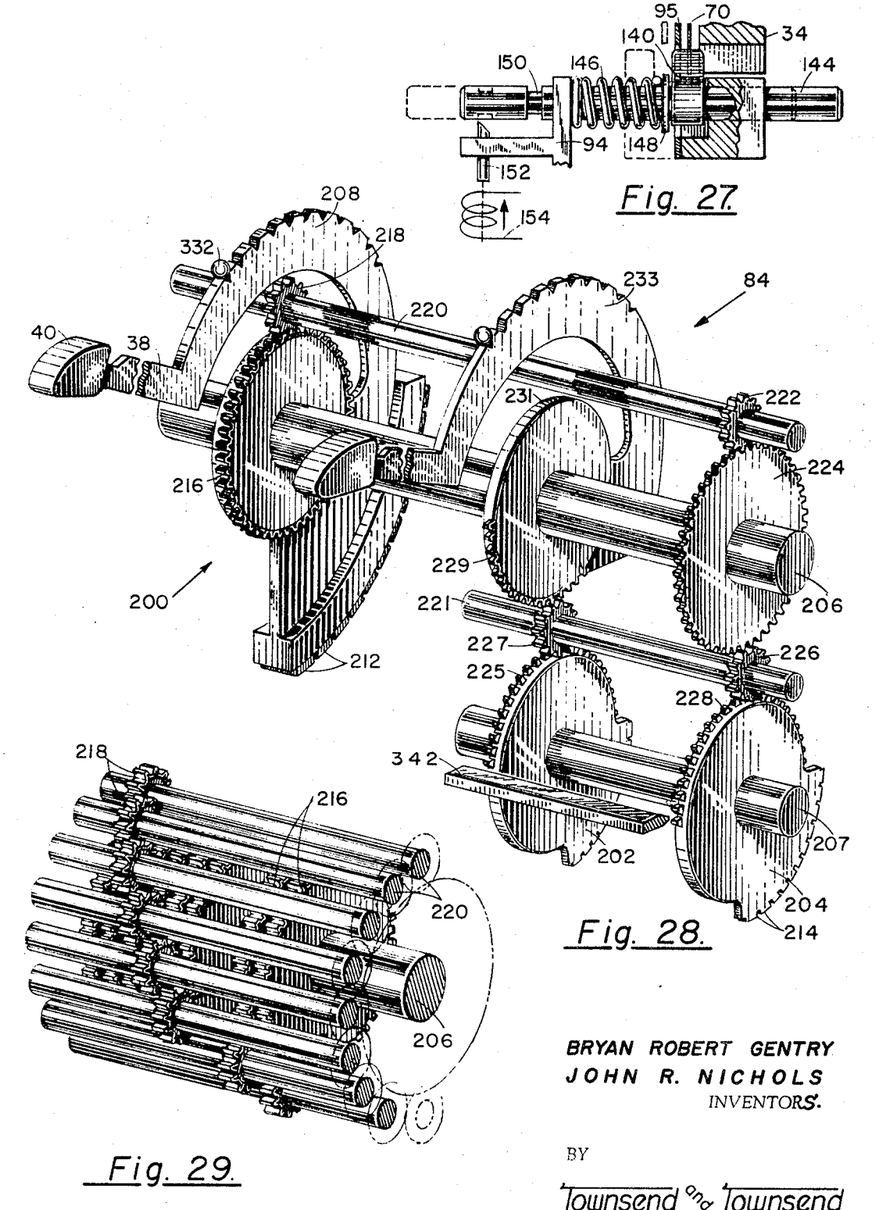
FIG. 27 is a fragmentary vertical section through a portion of the apparatus showing a part of the check positioning structure.
FIG. 28 is a fragmentary perspective view of a pair of amount printing devices and the corresponding MICR printing devices, showing the way in which they are interconnected for simultaneous movement.
FIG. 29 is a fragmentary perspective view of the gears on the amount printing devices and illustrating the way in which they are linked with corresponding MICR wheels.

FIG. 27 illustrates one way of releasably locking trip 140 in a location clearing the path of check 68. As plate 34 moves toward printing unit 84, it causes trip 140 to move into an opening 143 in shield 95 against the bias of a spring 146 surrounding shaft 144 and disposed between support 94 and a pin 148 carried by shaft 144. The shaft has a notch 150 which is alignable with a core 152 of a solenoid 154. Actuation of the solenoid causes core 152 to move toward and against shaft 144 and as the notch 150 becomes aligned with core 152, the latter moves into the notch and thereby releasably locks trip 140 against movement under the influence of spring 146. Solenoid 154 will have been energized before plate 34 forces trip 140 into opening 142. The solenoid will not be deenergized until the check, which passes between plate 34 and shield 95 has moved out of the apparatus. When the solenoid is deenergized, the core 152 is retracted and spring 146 returns trip 140 to its starting position, shown in FIG. 27.

*Drive mechanism*

Arms 104, discs 106 and shaft 108 all form parts of drive means 86. Shaft 108 is rotated by a spring motor 156 of the type which applies a constant torque during operation. Motor 156 has a portion 158 mounted on a shaft 160 and proximal ends of shafts 108 and 160 are interconnected by a winding release ratchet 162. Thus, shaft 108 is rotatable in one direction under the influence of motor 156 but it is not rotatable in the opposite direction.

A drum 164 is secured to shaft 108 and has a notch 166 which normally receives a pivotal dog 168. The dog is coupled to a solenoid 170 and is shifted to clear notch 166 when the solenoid is actuated. The solenoid is energized only for a relatively short time so that shaft 108 is only allowed to make a single revolution. At the end of the revolution, the dog returns again to its starting position in the notch to inhibit further rotation of the shaft. The solenoid is deenergized as trip 140 is moved into its locked position. This opens a shaft coupling the solenoid to a power source.

*Electrical system*

Key switch 60 must be closed before the apparatus is ready for operation. When the switch is closed, motor 134 becomes actuated by virtue of being connected by leads 172 and 174 to power terminals 176 which are connected to lead 66, the latter, in turn, being connected to a source of electrical power. Light 62 is an on/off indicator and it is lit when switch 60 is closed.

Trip 138 controls the three contact pairs of a switch 178 and trip 140 controls the two contact pairs of a switch 180. When a check is properly positioned in the apparatus, switches 178 and 180 are closed. Light 64, controlled by both of these switches through leads 182 and 184, is then lit and indicates a "ready" condition of the apparatus. Closing of switch 178 also energizes solenoid 154 of FIGS. 13 and 27 so that core 152 of the solenoid will move in a position to lock trip 140 when it is shifted by plate 34 as described above. Switches 178 and 180 are, therefore, safety factors which assure that the apparatus will not be energized unless a check is in the space between plate 34 and shield 94 and unless the check is properly positioned between these components. Trip 138 assures proper vertical position and trip 140 assures proper horizontal position of the check. Solenoid 170 for pivoting dog 168 is connected by leads 172 and 186 to switches 178 and 180 and also to a switch 190 which is closed when the print lever 50 is forced downwardly. Thus, lever 50 causes solenoid 170 to be energized and thereby causes shaft 108 to rotate to effect advancement of the platen 88 sufficiently to force the check into printing engagement with printing unit 84.

Leals 172 and 174 are also connected to an electromagnetic clutch 192 and electromagnetic brake 194 coupled with a shaft 196 for rewinding spring motor 156. Shaft 197 is coupled by means of a gear 198 to gear train 136 and thereby to motor 134. A switch 199 having two switch pairs is in series relationship with lead 172 to control clutch 192 and brake 194 in response to the radius of the short reeled portion 201 of spring motor 156 on shaft 196. The radius of portion 202 is sensed by roller 203 mounted for reciprocation as the radius of the portion increases and decreases. When the radius is above a certain value, one part of switch 199 is closed to energize the clutch. When the radius is below this value, the other part of the switch is closed and the brake is energized. The brake is normally energized so that the spring motor will cause rotation of shaft 108 each time solenoid 170 is energized. When the spring motor has been used a sufficient number of times so that the radius of portion 201 is reduced below the critical value, switch 199 is reversed. This deenergizes the brake and energizes the clutch to rotate shaft 196 under the influence of motor 134 which is continuously operating. Thus, the spring motor is always ready to rotate shaft 108.

Brake 194 normally is energized except when a check is to be printed. A switch 171 controlling the power applied to brake 194 is opened when solenoid 170 is energized and remains open until dog 168 is again received in notch 166. Thus, the brake is released and spring motor 156 can then cause shaft 108 to rotate.

*Printing unit*

Printing unit 84 includes a plurality of amount printing wheels or devices 200, a pair of MICR account number printing wheels 202 and a plurality of MICR amount printing wheels 204, there being a wheel 204 for each wheel 200, respectively. Wheels 200 are rotatably mounted on a common shaft 206 and these wheels rotate independently of each other. Similarly, wheels 202 and 204 are individually rotatable on a shaft 207. FIG. 7 illustrates how each wheel 200 has an arcuate detent bar 208 provided with notches 210 corresponding to the various printing areas 212 on the printing face of the wheel. Also, the detent bar 208 is rigid to the lever 38 on which a tab 40 is disposed to allow manual positioning of printing wheel 200.

Figure 11:
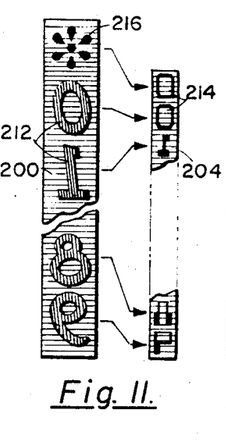
FIG. 11 is an elevational view of the amount and MICR print wheels for printing the first five digits from the left in the amount and MICR lines, the view looking in the direction of line 11—11 of FIG. 7.
Figure 12:
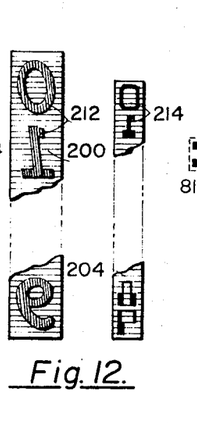
FIG. 12 is a view similar to FIG. 11 but illustrating the amount and MICR print wheels for printing the remaining digits of the amount and MICR lines, the view looking in the direction of line 12—12 of FIG. 7.

Each MICR amount wheel 204 has printing areas 214 identical in arrangement to printing areas 212. The faces of wheels 200 and 204 are shown in FIGS. 11 and 12. The wheel faces shown in FIG. 11 are the type used on the wheels for printing amounts of $10.00 or more. Each wheel 200 has a star shape character 215 which is to be used when the amount is less than the digit represented by the wheel. This character makes it more difficult for the amount of the check to be changed. In FIG. 12, the faces of the printing wheels which print amounts less than $10.00 are shown. It is noted that wheel 200 in FIG. 12 has no star shape character 215 since it is desired that a zero be printed in the manner shown in FIG. 2 when the amount is less than $1.00. The account number wheels 202 have printing faces identical to that of wheel 204 of FIG. 12.

FIG. 28 illustrates how each wheel 200 is linked to the respective wheel 204. A gear 216 is secured to each wheel 200 and a spur gear 218 is in mesh with gear 216. A rod 220 journaled on support 94 interconnects gear 218 with a similar gear 222 in mesh with gear 224 on shaft 206. An idler gear 226 meshes with gear 224 and a gear segment 228 on wheel 204. Thus, wheels 200 and 204 move together and the various gears and gear segments are selected so that the wheels move through the same increments. The corresponding printing areas on the printing faces of these wheels are simultaneously positioned for printing.

Each wheel 202 has a gear segment 225 (FIG. 28) in mesh with a spur gear 227 rotatably mounted on an adjacent rod 221. Gear 227 meshes with a gear segment 229 rotatably mounted on shaft 206 and secured to a hub 231 connected by an arcuate extension 233 to the corresponding lever 46. Thus, movement of lever 46 causes rotation of wheel 202.

Figure 16:
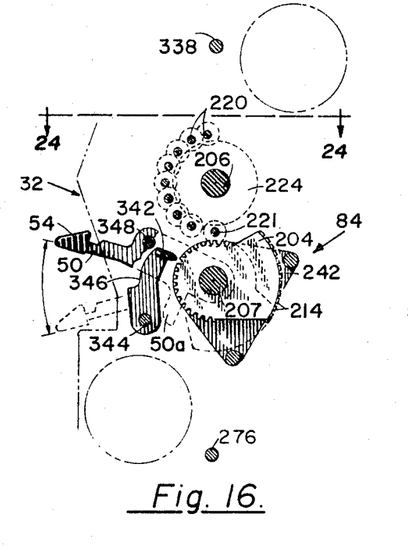
FIG. 16 is a view similar to FIG. 15 but showing the MICR printing assembly in greater detail.

FIGS. 16 and 29 show the way in which the various connecting rods 220 are arranged with respect to shaft 206. This explains the configuration of detent bars 208 and extensions 233. The detent bars and extensions 233 clear rods 220 and allow unimpeded rotation of wheels 200.

Figure 17:
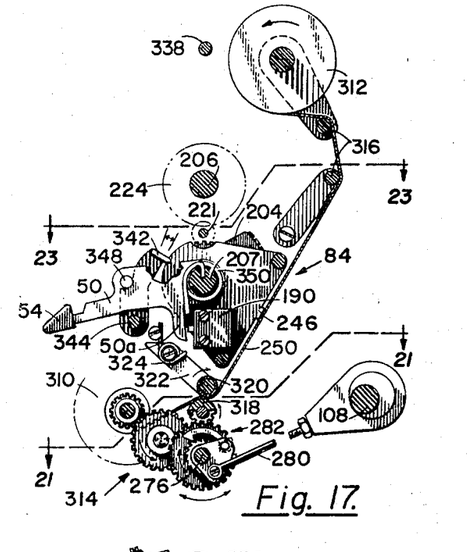
FIG. 17 is a vertical section through the MICR tape drive assembly, taken along line 17—17 of FIGS. 21, 23, 24 and 25.
Figure 23:
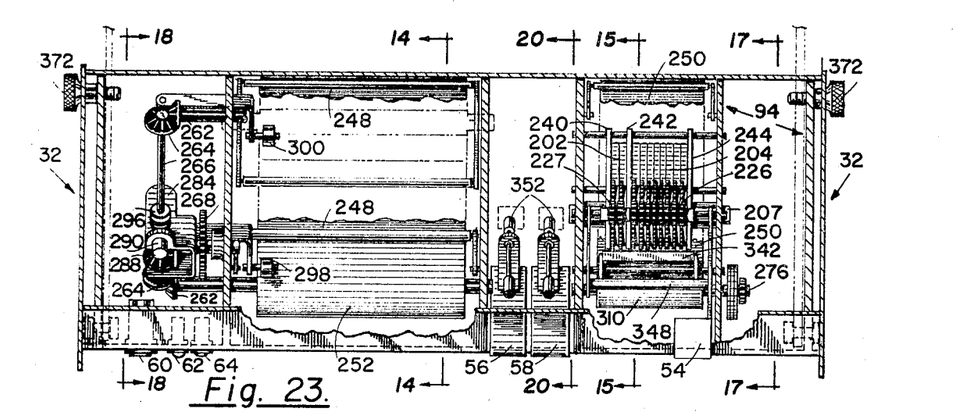
FIG. 23 is a cross sectional view taken along line 23—23 of FIGS. 14, 15, 17 and 23.
Figure 24:
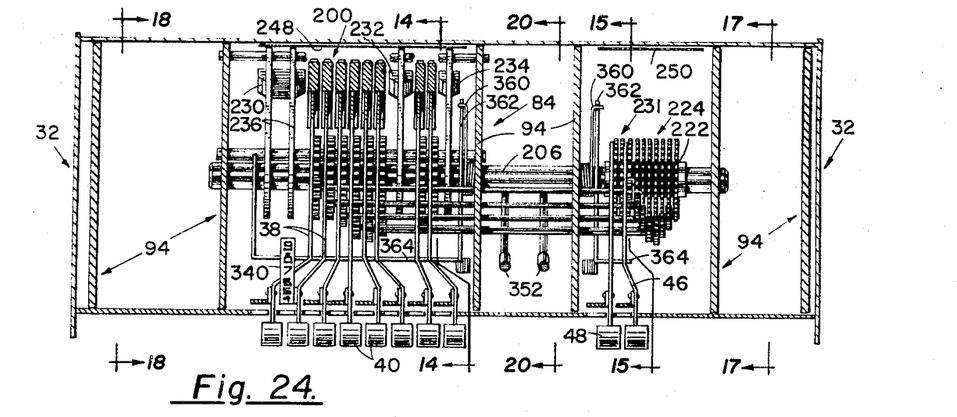
FIG. 24 is a cross sectional view taken along line 24—24 of FIGS. 14, 15, 16 and 24.

FIG. 24 illustrates slugs 230, 232 and 234 for applying the notations "PAY," "DOLS" and "CTS." These slugs are secured in any suitable manner such as by links 236 to support 94. Each slug has a printing area 238 which is aligned with the various printing areas of wheels 200 so that the amount line 74 will be uniformly printed as shown in FIGS. 2 and 8. Similarly, slugs 240, 242 and 244 (FIG. 23) are provided adjacent to wheels 202 and 204 for printing computer signals 81, 83 and 85 (FIGS. 3 and 9). These latter slugs have printing faces 246 as shown in FIG. 17.

An inked ribbon 248 (FIG. 18) is provided to transfer the impressions of the printing areas of wheels 200 to the check during a printing operation. Ribbon 248 is flexible and preferably has a different color for the dollars and cents amounts. The ribbon is sufficiently wide to transfer the impressions of the slugs 230 and 234 to the check. The ribbon is advanced each time the apparatus is actuated. The structure for advancing the ribbon will be set forth hereinafter.

Figure 4:
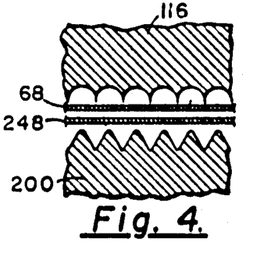
FIG. 4 is a fragmentary cross sectional view of a check and check serrating structure for writing the amount of the check before the latter is written.
Figure 5:
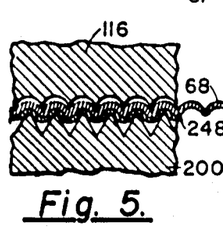
FIG. 5 is a view similar to FIG. 4 but showing the check as it is deformed or serrated and thereby written.

The printing areas of the wheels 200 are preferably serrated in the manner shown in FIGS. 4 and 5 so that a check printed thereby will be deformed or serrated to minimize the possibility of forgery. To this end, bar 116 is serrated to mesh with the serrations in wheels 200. FIG. 4 shows the relative positions of a wheel 200, the ribbon, a check and bar 116 before the check is serrated, and FIG. 5 illustrates the condition of the check as it is being serrated.

A magnetic tape 250 (FIG. 17) is provided adjacent to wheels 202 and 204 as well as slugs 240, 242 and 244 for transferring a magnetic film onto the check to form the MICR line 76 thereof during a print operation. Like ribbon 248, tape 250 is advanced each time the apparatus is actuated. This assures that a fresh (unused) portion of the tape will be presented to the MICR printing wheels before a succeeding check is printed.

Ribbon advancing mechanism

Ribbon 248 is wound on a pair of spools 252 and 254 (FIG. 18) and extends about a pair of idler rollers 256 adjacent to respective spools and is tensioned by a spring loaded bar 258 having ribbon-engaging rollers 260. Each of the spools has a bevel gear 262 rotatable therewith. A bevel gear 264 is in mesh with each bevel gear 262, gears 264 being rigidly secured to the ends of a shaft 266.

Shaft 266 is journaled on support 94 for axial rotation in opposed directions. It is also shiftably mounted on the support so that either one or the other of the bevel gears 264 at its ends is in mesh with the corresponding bevel gear 254, the length of shaft 266 being selected to permit only one of the gears 264 to be coupled to its gear 254 at any one time.

Rotational movement is applied to shaft 266 by a bevel gear 268 secured to a spur gear 270 rotatably mounted on support 94. Gear 270 meshes with an idler gear 272 which, in turn, meshes with a second spur gear 274 rigid to a shaft 276, journaled on support 94. Shaft 276 has a segment 278 rigid thereto and a link 280 is pivotally coupled at one end thereof to segment 278 (FIG. 17). Link 280 is eccentrically coupled at its opposite end to shaft 108. The configuration of segment 278 is such that it moves through an arcuate distance of approximately 45° relative to shaft 276 for each revolution of shaft 108. A ratchet and pawl assembly 282 is coupled with segment 278 and permits rotation of shaft 276 only when segment 278 rotates in a clockwise sense when viewing FIG. 17.

A yoke 284 (FIG. 18) is mounted on shaft 266 and allows the latter to rotate freely. Yoke 284 has bevel gears 286 and 288 coupled thereto which alternately mesh with bevel gear 268 depending upon position of shaft 266, relative to spools 252 and 254. When the lower bevel gear 264 meshes with its gear 252, gear 286 meshes with gear 268. Conversely, when the upper gear 264 meshes with its bevel gear 254, gear 288 meshes with gear 268.

A detent 290 is carried by yoke 284 and bears against either of the grooves 292 or 294 in a collar 296 depending upon the operative position of shaft 266. Groove 292 corresponds to driving spool 252 and groove 294 corresponds to driving spool 254.

Detent 290 is shifted from one groove to the other in response to an increase in radius of the spool receiving ribbon 248. To this end, rollers 298 and 300 engage the outer periphery of the ribbon adjacent respective spools and are interconnected by a rod 302 which extends through and is shiftable relative to yoke 284. A pair of springs 304 and 306 surround rod 302 within yoke 284 and are separated by a collar 308 secured to rod 302. The build-up in compression of either of the springs due to an increase in radius of the corresponding spool will cause the detent 290 to snap into the other groove.

In view of the foregoing construction, ribbon 248 can be shifted back and forth and be used for a relatively large number of impressions before it must be replaced.

Tape advancing mechanism

In FIG. 17, tape 250 is shown wound around spools 310 and 312. Since the magnetic material of the tape is transferred therefrom during each printing operation, the tape can only be used once. It is unwound from reel 312 and wound onto reel 310 by an incremental amount each time segment 278 is rotated by link 280 in the manner described above with respect to the ribbon advancing mechanism. To this end, a gear train 314 interconnects shaft 276 with spool 310 so that the latter is driven each time shaft 276 is rotated.

Tape 250 extends about a pair of upper idler rollers 316 and downwardly and partially about a capstan 318 and then onto spool 310. Capstan 318 is geared to gear train 314 and it drivingly engages the tape since a pressure roller 320 forces the tape onto the capstan. Roller 320 is carried by an arm 322 which is biased in the proper direction by a spring 324.

Printing wheel detent mechanism

Figure 14:
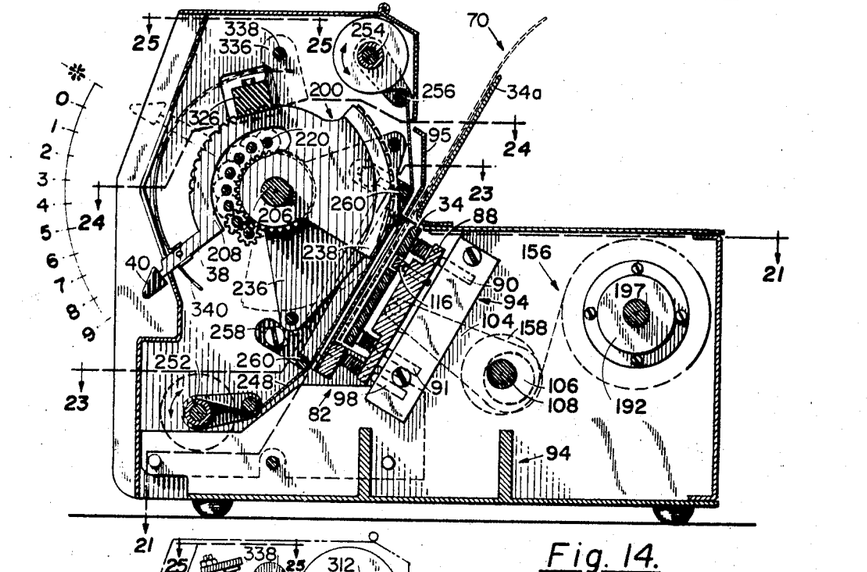
FIG. 14 is a vertical section through the amount printing assembly of the apparatus, taken along line 14—14 of FIGS. 21, 23, 24 and 25.
Figure 15:
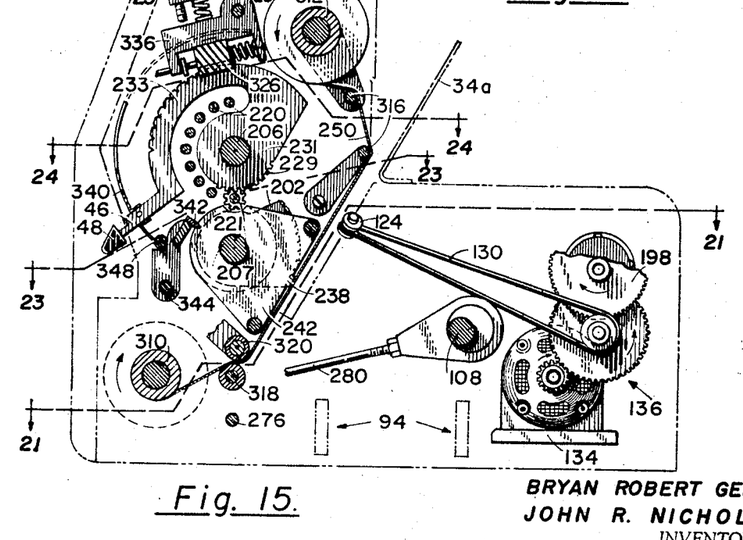
FIG. 15 is a vertical section through the MICR printing assembly of the apparatus, taken along line 15—15 of FIG. 21.
Figure 20:
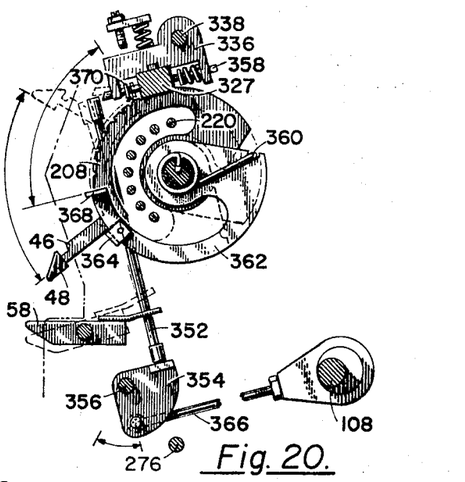
FIG. 20 is a vertical section through the amount printing assembly, showing the detent reset assembly, taken along line 20—20 of FIGS. 21, 23, 24 and 25.
Figures 25, 26:
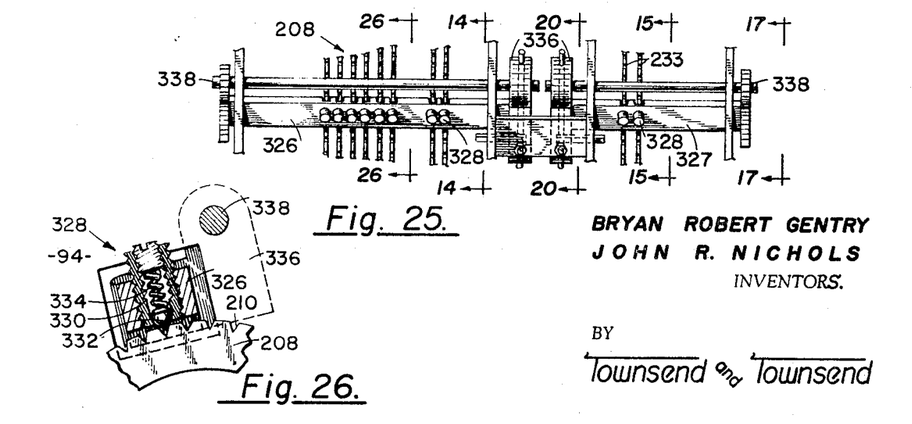
FIG. 25 is a top plan view taken along line 25—25 of FIGS. 14, 15, 18 and 22.
FIG. 26 is an enlarged fragmentary vertical section through the detent reset assembly looking in the direction of line 26—26 of FIG. 25.

To maintain amount printing wheels 200 and account printing wheels 202 in their operative positions, detent means is provided wherein detent bars 326 and 327 (FIGS. 25 and 26) are each provided with detent structure 328. Bars 326 and 327 are essentially the same in construction and operation so that the construction and operation of bar 326 will be described. Structure 328 includes an externally threaded tube 330 having a ball 332 biased by a spring 334 toward the corresponding bar 208. (FIGS. 7 and 20). Bar 326 is pivotally mounted by means of an arm 336 on a shaft 338 (FIGS. 20 and 26) and the arm is biased in a counterclockwise sense when viewing FIG. 20 by a spring 338. Thus, when each lever 38 is pressed downwardly to the desired position, the printing wheel will rotate and when it stops, the corresponding detent ball 332 will be received within an adjacent notch 210 of bar 208. This permits the operator to "feel" the accuracy of the setting. Each lever 38 has a telltale segment 340 (FIGS. 14 and 15) which indicates through the corresponding window 42 (FIG. 1) what the setting of the corresponding print wheel 200 actually is. Similarly, each lever 46 has a telltale segment which can be viewed through the window provided therefor.

The MICR printing wheels 204 do not have the ball detents of the type described with respect to wheels 200 and 202. Instead, an index bar 342 (FIGS. 13, 16 and 17) is provided to mesh with the gear segments 225 and 228 of wheels 202 and 204 when lever 50 is forced downwardly. This assures accuracy of the settings of the MICR printing wheels and overcomes any lag or backlash in the gears which interconnect wheels 200 and 204. Also, slugs 240, 242 and 244 each have a recess or notch for receiving the index bar.

Index bar 342 is mounted on the outer end of a pivotally mounted arm 344 (FIGS. 15, 16 and 17) provided with a cam surface 346 engageable by a cam rider 348 carried by lever 50. Thus, the apparatus will not be actuated unless the index bar is received in the notches of the gear segments. If its movement is blocked by the gear teeth, an extension 50a (FIG. 17) of lever 50 cannot actuate switch 190. Spring bias means (not shown) is provided to return arm 344 to its unlocked position shown in FIG. 16. FIG. 17 shows how the index bar meshes in a recess formed in one of the slugs while lever 50 is held in a downward position. A spring 350 (FIG. 17) biases lever 50 toward its uppermost position. So long as lever 50 is down, index bar 342 cannot retract from the position shown in FIG. 17.

To allow the amount printing wheels 200 to return to their starting positions after each check is written, means is provided to lift the detent balls 332 out of the notches of the bars 208. To this end, a rod 352 (FIG. 20) is pivotally secured at its lower end to a segment 354, the latter, in turn, being pivotally connected to a shaft 356 mounted on support 94. The upper end of rod 352 engages a spring loaded latch pin 358 attached to arm 336. As rod 352 moves upwardly, the arm 336 is pivoted in a clockwise sense, when viewing FIG. 20, to cause the ball detents 332 to be lifted away from the corresponding notches. A spring 360 biases a return arm 362 in a clockwise direction (FIG. 20) and arm 362 carries a cross bar 364 engaging the undersides of levers 38. The levers are, thus, rotated under the influence of spring 360 when the detent balls are pivoted away from wheels 200.

Rod 352 is shifted downwardly by the rotation of shaft 108 inasmuch as a link 366 interconnects this shaft with segment 354. The link 366 is eccentrically mounted at one end thereof on shaft 108 while being connected at its opposite end to segment 354.

A trip tab 368 on return arm 362 engages a projection 370 on latch pin 358 to disengage the latter from rod 352. This allows the detent balls 332 to be lowered once again toward their corresponding wheels 200.

If the operator desires to use the same amount for a number of checks and does not desire to have the automatic resetting of wheels 200 to their starting position, tab 56 is depressed so that it assumes the dashed line position of FIG. 20. When this occurs, rod 352 is pivoted in a counterclockwise sense when viewing FIG. 20 relative to segment 354. Thus, the rod will not engage latch pin 358 for each rotation of shaft 108 and detent balls 332 remain in place.

It is to be noted that identical detent and release structure is provided for account wheels 202. Thus, it is believed unnecessary to discuss the way in which the account wheels are manually or automatically reset.

Ribbon and tape replacement

Figure 22:
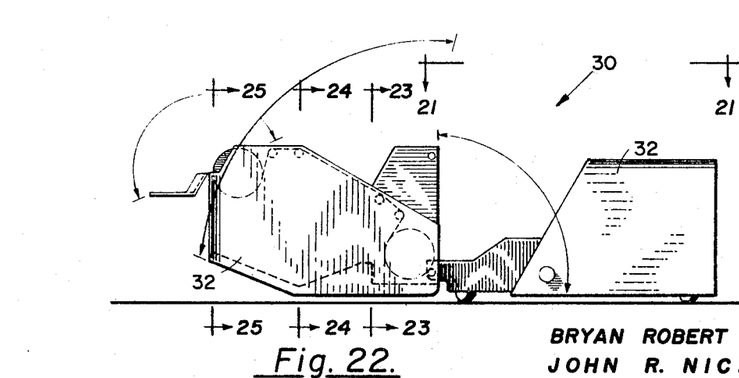
FIG. 22 is a side elevational view of the housing of the apparatus, showing the way the housing can be opened to gain access to the interior thereof.

Housing 32 can be opened in the maner shown in FIG. 22 by manipulating locking screws 372, only one of which is shown in FIG. 1. The front end section of the housing pivots approximately 90° forwardly and when this occurs, ribbon 248 and tape 250 are accessible for removal and replacement. Provision can be made to cause gears 270 and 272 (FIG. 18) to be separated when the front section of the housing swings to the open position. This facilitates removal of the ribbon. Also, provision can be made so that gear train 314 (FIG. 17) can be divided to facilitate removal of the tape. When the ribbon and tape have been replaced, the housing is again closed and secured in place and the apparatus is again ready for use. Also, roller 320 can be made to separate from capstan 318 in any suitable manner to facilitate placement of the tape therebetween.

Detailed operation

To place apparatus 30 in condition for operation, an operator inserts a key in switch 60 and turns the apparatus on by closing the switch. This causes motor 134 to be energized through the following circuit: a first terminal 176, lead 176a, switch 60, lead 172, motor 134, lead 174 and the other terminal 176. It is assumed that terminals 176 are coupled to a source of power. Also, when switch 60 is closed, on-off light 62 is lit through the following circuit: a first terminal 176, lead 176a, switch 60, lead 62a, light 62, lead 62b and the other terminal 176. The apparatus is now ready to receive a check to be written.

The operator places a check against the front face of extension 34a and allows the check to gravitate into the apparatus. After it reaches wheels 124, the check is driven downwardly and to the side, in a direction toward trips 138 and 140. The check comes to a halt against trip 140, while at the same time the check is directly above and in engagement with trip 138. The trips are shiftable sufficiently to close the switch pairs of switches 178 and 180. When switch 178 is closed, it energizes solenoid 154 (FIGS. 13 and 27) through the following circuit: a first terminal 176, switch 60, lead 182, switch 178, solenoid 154, lead 154a and the other terminal 176. The "ready" light 164 is also energized when switches 178 and 180 are closed through the following circuit: the first terminal 176, lead 176a, switch 60, lead 182, switches 178 and 180, lead 184, light 64, lead 62b and the other terminal 176. The ready light indicates that the check in the apparatus is ready to be written and the next step for the operator is to force tab 54 and thereby lever 50 downwardly. It is to be noted that the ready light 64 and solenoid 154 will not be energized unless switch 60 is closed. Also, as will become clear hereinafter, solenoid 170 which controls dog 168 will also not be energized until switch 60 is closed.

The operator may set up the amount and the account number in the apparatus either before or after the check is inserted in place. In either case, the operator manipulates the various tabs 40 and thereby their respective levers 38. The amount is determined by the relative settings of levers 38, the two levers 38 at the far right of FIG. 1 defining the cents portion of the amount. The settings of levers 38 can be viewed in windows 42 inasmuch as telltale segments 340 are viewed through these windows. Similarly, the settings of levers 46 can be viewed since corresponding telltale segments are provided for these levers.

As each lever 38 is moved into the desired location, the corresponding MICR wheel 204 is shifted into a position to print the same figure. This transferred movement is effected by the gears 216 of wheels 200 which cause rotation of rods 220 and thereby the rotation of gear segments 228 on respective wheels 204. After the amount and the account number have been set up, the next step is to force lever 50 downwardly to close switch 190.

When switch 190 is closed, solenoid 170 is actuated to withdraw dog 168 from notch 166 of drum 164. This is accomplished through the following circuit: the first terminal 176, lead 176a, switch 60, lead 172, solenoid 170, lead 186, switches 178 and 180, switch 190, switch 178, solenoid 154, lead 154a and the other terminal 176. As dog 168 is removed from notch 166, shaft 108 is free to rotate relative to support 94 under the influence of spring motor 156. As it rotates through the first part of a revolution, shaft 108 causes discs 106 to advance arms 104 in the direction of platen 88. This causes platen 88 to move with plate 34 and shield 95 until the shield engages stop 110. When this occurs, the printing wheels 200, 202 and 204 are flush with back surface of printing windows 112 and 114 of shield 95.

Even though shield 95 has been stopped, plate 34 and platen 88 continue to move together until plate 34 engages the back face of check 68. This brings plate 34 to a halt but the platen 88 continues to move to the end of its path of travel.

As platen 88 approaches the end of its path of travel, bars 116 and 118 move through openings 120 and 122 of plate 34 and into engagement with the rear face of the check. The bars force the check against the printing wheels to cause the check to be written. Wheels 200 serrate the check in the manner shown in FIGS. 4 and 5, while wheels 202 and 204 print the magnetic MICR indicia 76 on the MICR line of the check.

During the printing operation, wheels 200, 202 and 204 are held against movement relative to the check to assure that the check will be properly written. To this end, detent balls 332 are recessed in the notches 210 of detent bars 208 of wheels 200. Notches 210 correspond to the amount which is to be printed. To hold wheels 202 in place, they will have detent balls similar to balls 332. Wheels 204 will be held in place by an index bar 342 which is recessed within one of the recesses formed by the gear teeth of each wheel 204. The index bar is moved into this position by the downward movement of cam rider 348.

After the platen 88 has reached the forward end of its path of travel, shaft 108 will have rotated approximately 180°. However, dog 168 allows this shaft to rotate one complete revolution. Thus, platen 88 begins to retract immediately after the check is written.

As platen 88 retracts, spring 96 and 100 begin to expand and allow plate 34 and shield 95 to move in the same direction as platen 88. The clamping action on the check by plate 34 and shield 95 is thereby relaxed and wheels 124 again move through opening 128 and engage the check.

Although plate 34 and shield 95 retract with platen 88, trip 140 is releasably held by core 152 of solenoid 154. Thus, the path of the check is unimpeded by trip 140 after plate 34 and shield 95 have returned to their starting positions and as wheels 124 once again engage the rear face of the check. The check is then forced laterally and out of the apparatus. The apparatus is then ready for receiving another check to be written.

Figures 18, 19:
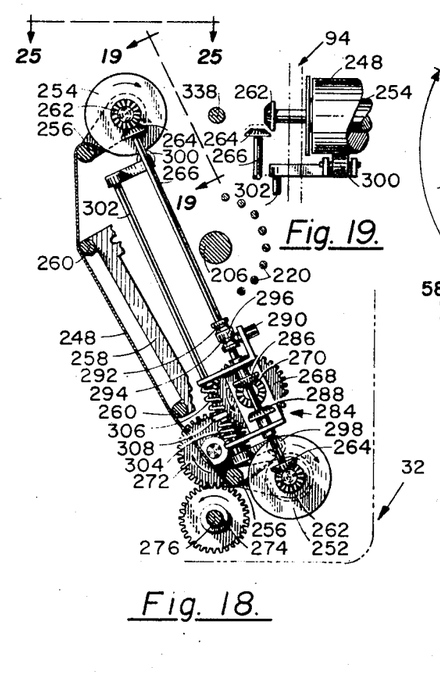
FIG. 18 is a vertical section through the amount ribbon drive assembly, taken along line 18—18 of FIGS. 21, 23 and 24.
FIG. 19 is a view taken along line 19—19 of FIG. 18.

During the single revolution of shaft 108, ribbon 248 and tape 250 are advanced by the rotation of segment 278 through link 280 (FIGS. 17 and 18). Also, the detent structure inhibiting the movement of wheels 200 and 202 during a printing cycle are lifted away from their respective wheels by the rotation of segments 354 and the translation of rods 352 (FIG. 20).

After the check has been written, it can be folded and placed in an envelope provided therefor. The envelope can then be mailed or hand carried to a distribution point.

While one embodiment of this invention has been shown and described, it will be apparent that other adaptations and modifications can be made without departing from the true spirit and scope of the invention.

We claim:

1. Check-writing apparatus comprising: a support structure on the support for receiving a check to be printed; a printing unit mounted on said support and including a plurality of first printing devices at a first location adjacent to one side of said support structure and a plurality of second printing devices at a second location adjacent to said one side of the structure, there being guide means engageable with a check received by said structure for positioning the check with first and second zones thereof adjacent to said first and second locations respectively, there being a second device for each first device respectively, each of said devices having a number of printing areas thereon and being mounted for movement relative to said support to permit any one of said printing areas of the device to be moved into an operative position in alignment with a respective zone of a check received by said structure, whereby the check will be written at said zones when the check is engaged by devices having printing areas in respective operative positions, said first devices being selectively movable independently of each other; means interconnecting each first device and the respective second device for moving the second device relative to the support in response to the selective movement of the first device relative to the support, whereby corresponding printing areas of respective first and second devices will simultaneously be moved into their printing dispositions, said structure and said printing unit being movable relative to each other to permit said devices to move into and out of engagement with a check received by said structure; and means coupled with said structure and said printing unit for moving the same relative to each other.

2. Check-writing apparatus as set forth in claim 1, wherein is provided means coupled with each first device for releasably maintaining the same in a fixed position as the structure and said printing unit move relative to each other.

3. Check-writing apparatus as set forth in claim 1, wherein is provided an inked ribbon between said first devices and said structure and a magnetic tape between said second devices and said structure.

4. Check-writing apparatus as set forth in claim 3, wherein said ribbon and said tape are mounted on said support for movement relative to respective devices, and means coupled with said ribbon and said tape for moving the same relative to respective devices in response to the movement of said support relative to said printing unit.

5. Check-writing apparatus as set forth in claim 1, wherein is provided a series of third printing devices adjacent to said second devices and disposed to engage a check held by said structure when the check is engaged by said first and second devices, said third devices being selectively movable independently of each other, each third device having a group of printing regions thereon and being movable relative to said support to permit any one of the regions to be moved into a printing disposition relative to said structure.

6. Check-writing apparatus as set forth in claim 1, wherein is provided means on said structure for moving a check into said printing position before the check is written and for moving the check from said position after it has been written.

7. Check-writing apparatus as set forth in claim 1, wherein each device is mounted on said support for rotation in a plane perpendicular to said one side of the structure and provided with an arcuate outer periphery having the corresponding printing areas thereon.

8. Check-writing apparatus as set forth in claim 1, wherein is provided a pair of laterally spaced shafts mounted on said support in parallelism to said one side of the structure, each first device being rotatably mounted on one shaft and each second device being rotatably mounted on the other shaft, and including a tab on each first shaft for manually moving the same relative to said one shaft.

9. Check-writing apparatus as set forth in claim 1, wherein said interconnecting means includes a gear mechanism.

10. Check-writing apparatus as set forth in claim 1, wherein each device is rotatably mounted on said support and is provided with a gear segment thereon, said interconnecting means for each first and second device including a pair of spaced axially aligned gears in mesh with the gear segment of a respective device, and a link rigidly interconnecting said gears.

11. Check-writing apparatus as set forth in claim 1, wherein said means for moving said structure and said printing unit relative to each other includes an actuatable drive motor, said structure including a switch coupled with said motor and disposed for actuating the same as a function of the position of a check held by said structure.

12. Apparatus for writing the amount of a check on the amount line and the MICR line of the check comprising: a support having structure for receiving a check to be printed; a printing unit mounted on said support and including a plurality of pairs of rotatable amount printing devices, the devices of each pair being spaced apart and in generally parallel planes at respective locations with respect to said structure, there being stop means on said support for engaging a check received by said structure to position the check with the amount line and the MICR lines thereof adjacent to respective locations of said devices, each device having a number of printing areas thereon and being mounted for rotation relative to said support to permit any one of said printing areas to be moved into an operative position in alignment with a respective one of said amount and MICR lines of a check received by said structure, whereby the check will be written at said amount and MICR lines thereof when it is engaged by devices having printing areas in respective operative positions; means interconnecting the devices of each pair to permit the devices to rotate simultaneously with each other relative to said support and to allow their corresponding printing areas to be moved into their printing locations, whereby an amount defined by said printing areas will be printed on the amount and MICR lines of a check when the latter is engaged by the devices, said structure and said unit being relatively movable toward and away from each other to permit a check received by the structure to be alternately engaged by and disengaged from said devices; and means coupled with said structure and said unit for moving the same relative to each other.

13. In check-writing apparatus: a support having means thereon for holding a check in a printing position; a plurality of first printing devices on said support at a first location and a plurality of second printing devices on said support at a second location, there being a second device for each first device respectively, each of the devices having a number of printing areas thereon and being mounted for movement relative to said support to permit any one of said printing areas of the device to be moved into a printing dispositions adjacent to the holding means, whereby a check held in the support can be written at a pair of zones thereon corresponding to said locations when the check is engaged by devices having printing areas in respective printing disposition, said first devices being selectively movable independently of each other; means interconnecting each first device and the respective second device for moving the second device relative to the support in response to the selective movement of the first device relative to the support by an amount sufficient to position corresponding printing areas of the last-mentioned first and second devices in respective printing dispositions, whereby the same indicia will be imprinted on the check at said zones; first means for releasably holding the first devices in their printing dispositions as they print a check; second means for holding the second devices in their printing dispositions when the second devices print the check; and means coupled with said check holding means for moving a check relative to and into printing relationship with the devices having printing areas in printing dispositions.

14. In check-writing apparatus as set forth in claim 13, wherein said devices are rotatable, each of said first and second devices having a notched outer periphery, said first means including a detent receivable in the notch of each first device respectively, said second means including an index bar common to said second devices and being receivable within the notches thereof.

15. In checking apparatus as set forth in claim 14, wherein the detents of said first means are independent of the index bar of said second means.

16. Check-writing apparatus comprising: a support having structure thereon for holding a check in a printing position; a force applying member on said structure and engageable with the check for moving the same in one direction and into said position; stop means for interrupting the movement of the check in said one direction as the check moves into said position; a printing unit mounted on said support and including a plurality of first printing devices at a first location adjacent to one side of said structure and a plurality of second printing devices at a second location adjacent to said one side of the structure, there being a second device for each first device respectively, each of said devices having a number of printing areas thereon and being mounted for movement relative to said support to permit any one of said printing areas of the device to be moved into a printing disposition relative to said structure, whereby a check held in said structure will be written at a pair of zones thereon corresponding to said locations when the check is engaged by devices having printing areas in respective printing dispositions, said first devices being selectvely movable independently of each other; means interconnecting each first device and the respective second device for moving the second device relative to the support in response to the selective movement of the first device relative to the support, whereby corresponding printing areas of respective first and second devices will simultaneously be moved into their printing dispositions, said structure and said printing unit being movable relative to each other sufficiently to permit said devices whose printing areas are in respective printing dispositions to move simultaneously into and out of engagement with a check held by said structure; and means coupled with said structure and said printing unit for moving the same relative to each other, said stop means being movable relative to said structure into a location clearing said check after the latter has been written to permit the check to again be moved in said one direction by said member.

17. Check-writing apparatus comprising: a support having structure thereon for holding a check in a printing position; a printing unit mounted on said support and including a plurality of first printing devices at a first location adjacent to one side of said structure and a plurality of second printing devices at a second location adjacent to said one side of the structure, there being a second device for each first device respectively, each of said devices having a number of printing areas thereon and being mounted for movement relative to said support to permit any one of said printing areas of the device to be moved into a printing disposition relative to said structure, whereby a check held in said structure will be written at a pair of zones thereon corresponding to said locations when the check is engaged by devices having printing areas in respective printing dispositions, said first devices being selectively movable independently of each other; means interconnecting each first device and the respective second device for moving the second device relative to the support in response to the selective movement of the first device relative to the support, whereby corresponding printing areas of respective first and second devices will simultaneously be moved into their printing dispositions, said structure and said printing unit being movable relative to each other to permit said devices to move into and out of engagement with a check held by said structure; means coupled with said structure and said printing unit for moving the same relative to each other, each first device being movable from a starting position to any one of a number of operative positions; means shiftably mounted on said support and coupled with each first device for releasably maintaining the latter in an operative position when a printing area thereof is in a printing disposition; means responsive to the relative movement of said structure and said printing unit for shifting said maintaining means in a direction to release each first device after a check has been written; and means coupled with each first device for returning the latter to its starting position after it has been released.

18. Check-writing apparatus as set forth in claim 17, wherein said maintaining means includes a shiftable detent for each first device respectively, the latter having a detent-receiving notch for each of its printing areas respectively, said shifting means including a link engageable with said detent for moving the latter away from the corresponding first device, and means operably coupling said link to said means for moving said structure and said printing unit relative to each other.

19. A method of writing the amount of a check at a pair of zones thereon comprising the steps of: placing a check in a location adjacent to a pair of spaced amount printing regions aligned with predetermined zones of the check; providing printing indicia at said regions with the indicia corresponding to the amount to be written; moving the check and the printing indicia relative to and into engagement with each other; serrating the check at one of the zones with the corresponding indicia and applying a magnetic film to the other zone with the corresponding indicia when the indicia and check are in engagement with each other; and shifting the printed check and the indicia relative to and away from each other.

20. A method as set forth in claim 19, wherein is included the step of releasably holding the selected indicia in said operative locations as they engage the check.

21. A method as set forth in claim 19, wherein the step of moving the printed check and selected indicia away from each other includes shifting the check in a first direction away from said operative locations of said indicia and thereafter shifting the check in a second direction disposed transversely of said first direction as a function of the movement in said first direction.

22. A method as set forth in claim 19, wherein is included the steps of providing selective classification indicia at a third region adjacent to one of said pair of regions with the third region having an operative location, moving selected classification indicia into the operative location of said third region.

References Cited

UNITED STATES PATENTS

| | | | |
|---|---|---|---|
| 1,229,844 | 6/1917 | White | 101—90 |
| 2,050,745 | 8/1936 | Woodruff | 101—407 X |
| 2,070,763 | 2/1937 | Ward | 101—95 |
| 2,141,577 | 12/1938 | Watson et al. | 101—90 X |
| 2,211,310 | 8/1940 | Andrews | 101—19 |
| 2,582,187 | 1/1952 | Wolowitz | 101—90 |
| 2,783,710 | 3/1957 | Wenthe et al. | 101—234 |
| 2,794,387 | 6/1957 | Schultz | 101—20 |
| 2,841,076 | 7/1958 | Johnson et al. | 101—233 X |
| 3,020,116 | 2/1962 | Pudelko | 101—90 |
| 3,064,560 | 11/1962 | Perry et al. | 101—90 |
| 3,279,369 | 10/1966 | White | 101—269 |
| 3,296,959 | 1/1967 | Sewell | 101—90 X |
| 3,340,801 | 9/1967 | Shoup | 101—90 |
| 3,343,482 | 9/1967 | Scott et al. | 101—90 |
| 1,210,071 | 12/1916 | Hoffman | 101—90 |
| 1,957,167 | 5/1934 | Hoffman | 101—90 |
| 2,935,935 | 5/1960 | Preston et al. | 101—93 |

WILLIAM B. PENN, *Primary Examiner.*

U.S. Cl. X.R.

101—19, 93